March 8, 1966     C. G. TOLSON     3,238,606

HEAT EXCHANGER MANUFACTURE

Filed Feb. 5, 1962

INVENTOR.
CHARLES G. TOLSON

BY Edward C. Areay

ATTORNEY

United States Patent Office 3,238,606
Patented Mar. 8, 1966

3,238,606
HEAT EXCHANGER MANUFACTURE
Charles G. Tolson, Rock Island, Ill., assignor to American Air Filter Company, Inc., Louisville, Ky., a corporation of Delaware
Filed Feb. 5, 1962, Ser. No. 171,216
3 Claims. (Cl. 29—157.3)

This invention relates generally to the manufacture of heat exchangers and particularly to a method of securing heat exchanger tubes to headers.

One conventional method of making a tube-header assembly includes the steps of: forming openings in a wall of a cylindrical header by a drawing operation which displaces metal from the openings inwardly to form inwardly projecting collars; inserting tubes into the openings in the same direction as the collar projects; positioning solder rings which encircle the tubes at the junction of the outside surface of the header and tube; and then playing a gas torch around the inside wall of the header in the area of the tube and header junction to melt the solder rings after the heat from the torch has been conducted through the interposed walls of the tubes and headers. Such a method results in the deposit in the interior of the header and tubes of the products of combustion from the gas torch, which condition adversely affects the heat transfer of the heat exchanger.

Thus the general object of this invention is the provision of a method of joining tubes and headers in a manner which minimizes the deposit of those contaminants destructive of good heat transfer properties within the headers and tubes.

The invention will be described in connection with the accompanying drawing wherein.

The invention will be described in connection with a cylindrical header which is longitudinally sectioned to permit access to both faces of the header wall portion which contains the tube receiving openings. It will be appreciated that the principles of the invention are applicable to headers of other configurations so long as sufficient access is provided that the heating elements of the soldering machine may be moved into contact with the soldering rings used.

Figure 1:
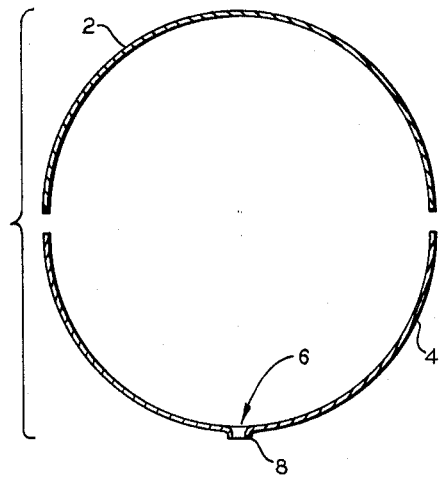
FIGURE 1 is a transverse sectional view of a cylindrical header in an initial stage of manufacture.

In FIGURE 1, the upper longitudinal section of the header is designated 2, and the lower section 4 contains a row of tube receiving openings 6 formed by a conventional drawing operation which displaces the metal outwardly to form a collar 8. The inside diameter of the collar is substantially the same as the outside diameter of the tube which is to be inserted therein.

Figure 2:
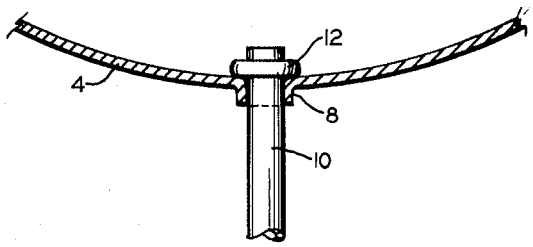
FIGURE 2 is an enlarged fragmentary sectional view of the header, a tube and the soldering ring in position for a subsequent soldering operation.

The heat exchanger tubes 10 (FIGURES 2-4) are inserted in the collar, in a direction opposite to the direction in which the collar projects, sufficiently far that the tube end projects past the inside face of the header wall containing the openings. The distance which the tube end projects into the header is preferably sufficient that a tube encircling solder ring 12, such as a Silfos ring, is accommodated or seated at the junction of the header wall inner face and the inwardly projecting end of the tube.

Figure 4:
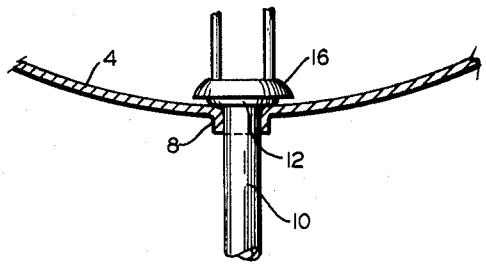
FIGURE 4 is a fragmentary transverse sectional view similar to FIGURE 2 showing the heating element being applied to a soldering ring.

The assembly is then ready for the soldering operation. This operation is carried out by the means of a soldering gun 14 having a ring-shaped tip or nose 16 which is sized to slip over the projecting end of the tube in a reasonably close fit. The ring nose 16 is moved into contact with the soldering ring 12 so that the soldering ring is pushed snugly against the inner face of the header wall (FIGURE 4). The gun 14 is then energized so that heat devoid of flame will be conducted from the ring nose to melt the solder ring 12. The melted solder flows, primarily by capillary action, between the outer face of the tube wall and the inner face of the collar wall to form a secure bond between the header and tube.

Figure 3:
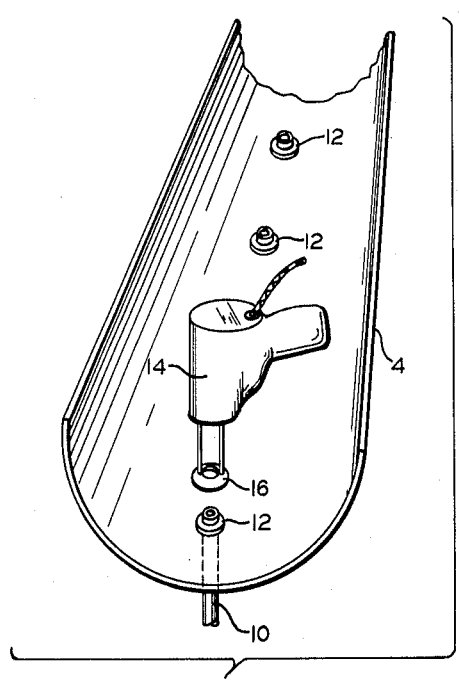
FIGURE 3 is a fragmentary perspective view of the header; tubes, and soldering rings, and showing a soldering gun posed before it is moved into contact with the soldering ring.

As shown in FIGURE 3, the soldering rings may be melted in succession by a single gun; or a grouping or gang of guns may be arranged to simultaneously melt a number of soldering rings.

After the operation of bonding the tubes and header is performed, the upper section 2 of the header may be joined to the lower section 4 by soldering along the section edges.

Figure 5:
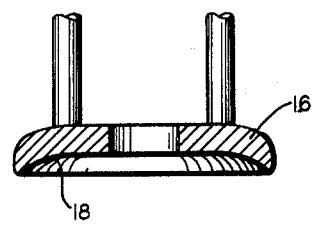
FIGURE 5 is a sectional view through a soldering gun ring nose having one particular configuration.

If desired the ring nose 16 may be provided with a concave contacting surface 18 with respect to a radial section through the nose as shown in FIGURE 5. A nose of such a configuration, or one which at least has an outer periphery forward of the inner periphery in an axial direction, will tend to confine the solder generally to the junction of the tube and header.

It will be appreciated that the present invention not only avoids the use of an open flame heating means for melting the solder, but also results in an arrangement wherein the direction of heat flow is the same as the direction in which the solder is to flow.

Having described my invention, I claim:

1. In the method of making a heat exchanger tube-header assembly:
    (a) forming openings in a wall of said header to which access may be had from opposite sides by displacing the metal in one direction to form collars projecting from one face of said wall;
    (b) inserting the ends of said tubes into said openings in a direction opposite the direction in which said collars project;
    (c) positioning said tube ends to project beyond the opposite wall face;
    (d) placing solder rings in encircling relation on the projecting ends of said tubes; and
    (e) applying a sole flameless, ring-shaped, direct heat-conductive ironing element over each of said projecting tube ends into direct substantially conforming contact with said solder rings and substantially in contact with the header wall for a sufficient period to heat said wall and to directly melt said rings so that melted solder therefrom flows between said tubes and the inner surfaces of said collars.

2. In the method of making a heat exchanger tube-header assembly:
    (a) drawing collars projecting in one direction in the wall of said header;
    (b) inserting said tubes into said collars to project through said wall in a direction opposite to the direction in which said collars project;
    (c) placing soldering rings on the ends of said tubes projecting in said opposite direction;
    (d) directly contacting said rings with a sole flameless, direct heat emitting ironing element of circular configuration by moving said element, relative to said ring, in the direction in which said collars project to be in substantial contact with said header wall for a sufficient period to heat said wall so that melted solder flows between said tubes and the inner surfaces of said collars.

3. In the method of making a heat exchanger tube-header assembly:
 (a) drawing collars projecting in one direction in the wall of said header;
 (b) inserting said tubes into said collars to project through said wall in a direction opposite to the direction in which said collars project;
 (c) placing soldering rings on the ends of said tubes projecting in said opposite direction;
 (d) contacting said rings with a sole flameless, direct heat emitting ironing element of circular configuration presenting a concave surface in a radial direction by moving said element, relative to said ring in conforming relationship therewith, in the direction in which said collars project to be in substantial contact with said header wall for a sufficient period to heat said wall so that melted solder flows between said tubes and the inner surfaces of said collars.

References Cited by the Examiner

UNITED STATES PATENTS

| | | | |
|---|---|---|---|
| Re. 4,934 | 6/1872 | McMurray | 113—106 |
| 100,243 | 2/1870 | Sturtevant | 29—157.3 |
| 1,105,778 | 8/1914 | Hausheer | 29—483 X |
| 2,081,603 | 5/1937 | Sandberg | 29—500 X |
| 2,152,812 | 4/1939 | Money | 29—500 X |
| 2,424,888 | 10/1947 | Moore | 29—157.4 |
| 2,448,329 | 8/1948 | Schwinn | 29—501 X |
| 2,523,638 | 9/1950 | Tice | 113—105 |

FOREIGN PATENTS 594,153   6/1925   France.

WHITMORE A. WILTZ, *Primary Examiner.*

NEDWIN BERGER, *Examiner.*